United States Patent Office 2,913,491
Patented Nov. 17, 1959

2,913,491

PREPARATION OF CARBOXYLIC ACIDS FROM CARBON MONOXIDE AND MERCAPTANS

Kenneth E. Furman, Richmond, Calif., assignor to Shell Development Company, New York, N.Y., a corporation of Delaware No Drawing. Application September 23, 1957
Serial No. 685,421

12 Claims. (Cl. 260—540)

This invention relates to the production of organic compounds and relates more particularly to the preparation of secondary and tertiary carboxylic acids from starting materials comprising carbon monoxide and mercaptans.

It is known that reaction mixtures containing organic acids can be obtained by contacting an admixture of carbon monoxide, water and an organic component, such as an olefine, with a suitable catalyst under proper conditions. Many processes have been disclosed heretofore directed to the conversion of such admixtures to organic acid-containing mixtures. In all of them water in substantial amount is relied upon as an essential component of the initial charge. Because of inherent disadvantages, however, these processes often have failed to provide satisfactory means for production of specific organic acids particularly those having at least four carbon atoms to the molecule. These disadvantages include, for example, inability to produce a reaction product predominating in a single specifically desired acid, and reliance upon the use of organic charge materials readily converted to unwanted products under conditions employed. As a consequence of the complexity of the reaction mixtures often obtained in these processes and the relatively low content of the desired acid therein, the operation of recovering the desired compound in relatively pure state therefrom is often exceedingly difficult.

It is, therefore, an object of the present invention to provide an improved process for the production of organic acids from reactants comprising carbon monoxide and an organic component obviating the above difficulties. Another object of the invention is the provision of an improved process enabling the production of secondary and tertiary organic acids from carbon monoxide and mercaptan. Still another object of the present invention is the provision of an improved process enabling the conversion of reactants comprising carbon monoxide and mercaptans to reaction products predominating in a single desired organic acid. Other objects and advantages of the present invention will become apparent from the following detailed description thereof.

In copending application Serial No. 665,640, filed June 14, 1957 there is disclosed and claimed a process enabling the production of organic acids from starting materials comprising certain alcohols or ethers.

It has now been found that secondary and tertiary organic acids are produced efficiently by reacting a mercaptan with carbon monoxide in the presence of concentrated sulfuric acid in the liquid phase, in the absence of any substantial amount of added water, thereafter diluting the resulting reaction mixture with water in the absence of any substantial amount of free carbon monoxide addition, and separating organic acids from the resulting diluted reaction mixture.

The organic charge reacted with carbon monoxide in accordance with the invention comprises organic compounds containing one or more mercapto groups (—SH) as the sole reactive groups. Suitable organic compounds reacted with carbon monoxide in accordance with the invention comprise the mercaptans represented by the empirical formula:

$$RSH \qquad (I)$$

wherein R represents a hydrocarbyl group containing at least three carbon atoms attached to the mercapto group through an aliphatic carbon atom. Thus R in the foregoing formula may represent a member of the group consisting of aliphatic hydrocarbyl radicals, preferably a saturated hydrocarbyl radical, and aralkyl radicals. For example R may, represent a member of the group consisting of alkyl radicals, such as propyl, n-butyl, i-butyl, tert-butyl, amyl, hexyl, heptyl, octyl, nonyl, decyl; corresponding cycloalkyl and hydrocarbyl-substituted cycloalkyl groups; aralkyl groups, such as benzyl, xylyl, tolyl, cumyl, phenylethyl, homologues thereof; etc. Suitable organic charge to the process of the invention comprises mercaptans defined by the foregoing Formula I wherein one or more hydrogen atoms of the hydrocarbyl group are substituted by functional groups which are inert under the conditions of execution of the invention. Thus the hydrocarbyl group may have hydrogen therein substituted by a halogen, for example, chlorine, etc. Comprised within the suitable charge materials to the process of the invention are mercaptans containing more than one mercapto group. Mixtures of two or more of the above-defined mercaptans may be charged to the process of the invention.

Examples of mercaptans of the above-defined class are: n-butyl-, n-propyl-, sec-butyl-, tert-butyl- mercaptan; the normal, secondary and tertiary hexyl-, heptyl-, octyl-, nonyl-, decyl- mercaptans; benzyl mercaptan; homologues and analogues thereof. Suitable charge material comprises the mercaptans having, for example, up to twenty carbon atoms. Saturated aliphatic mercaptans having from four to twelve carbon atoms to the molecule constitute preferred charge materials to the process. Of the suitable mercaptan charge materials those wherein a mercapto group is directly attached to a secondary or tertiary carbon atom are particularly preferred.

The mercaptan charge to the process of the invention need not necessarily be pure. Impurities in the amounts generally encountered in these materials as obtained commercially have no adverse effect upon the process. Such impurities comprise, for example, hydrocarbon material often present in the crude mercaptans. Suitable charge materials to the process of the invention comprise the mercaptan-containing streams produced in practical scale petroleum refining operations. These include, for example, the alkyl mercaptan-containing lower boiling hydrocarbon streams as well as the relatively concentrated alkyl mercaptans, obtained in hydrocarbon desulfurization refinery operations.

The carbon monoxide reactant need not necessarily be pure. Suitable carbon monoxide charge materials comprise the commercially available carbon monoxide and carbon monoxide-containing gases. The presence therein of fixed gases such as for example, hydrogen, nitrogen, etc., or of carbon dioxide or of minor amounts of saturated hydrocarbons does not adversely affect the process.

Interaction of the mercaptan reactant with carbon monoxide in accordance with the invention is effected in the presence of concentrated sulfuric acid. Essential to the attainment of the objects of the invention is the use of sulfuric acid in concentrated form, that is, in a concentration above 90% and preferably above about 95%. Dilute sulfuric acids generally lead to the obtaining of reaction mixtures containing relatively little if any of the desired carboxylic acids.

The reaction is executed in the presence of a molecular excess of concentrated sulfuric acid. Mole ratios of sulfuric acid to mercaptan charge in the range of from about 2:1 to about 10:1, have been found satisfactory. Greater or lesser amounts of sulfuric acid may, however, be employed within the scope of the invention. In a preferred method of executing the process of the invention the concentrated sulfuric acid is used in amounts exceeding about four moles of the acid per mole of mercaptan.

Reaction of the mercaptan with carbon monoxide is carried out at relatively mild conditions. Temperatures of, for example, from about −10° to about 100° C., and preferably in the range of from about 20° to about 60° C. are employed. Pressures ranging from about atmospheric to about 1,500 p.s.i.g. and higher may be used. However, pressures higher than about 700 p.s.i.g. need generally not be used. Pressures in the range of, for example, from about 100 to about 650 p.s.i.g. are generally preferred. A particularly suitable pressure range is that from about 450 to about 550 p.s.i.g. In a preferred method of carrying out the invention conditions are controlled so that at least a substantial part of the reaction mixture is in the liquid phase throughout the course of the reaction.

Essential to the attainment of the objects of the invention is the avoidance of introduction of any substantial amount of water into the reaction zone from an outside source during the course of the reaction of the mercaptan with carbon monoxide.

The mercaptan, as well as the carbon monoxide, charged to the process, may be subjected to suitable pretreatment to effect the removal of water and/or impurities therefrom. Such pretreatment may comprise one or more such steps as, for example, distillation, contact with suitable adsorbent material such as, for example, charcoal, adsorptive alumina, clays, etc.; the step chosen being governed by the material treated and the amount of impurity or water to be removed.

The reaction of the mercaptan with carbon monoxide in the presence of concentrated sulfuric acid may be executed in batch, continuous, or semi-continuous operations. In a suitable method of carrying out the process the concentrated sulfuric acid is first introduced into the reaction zone. The reaction zone is then brought up to the reaction pressure by the introduction of carbon monoxide. The mercaptan reactant is then introduced into the sulfuric acid, while under carbon monoxide pressure, in continuous or intermittent flow. The reaction zone is maintained at the desired reaction pressure by continuous pressure with carbon monoxide. Contact between the mercaptan and carbon monoxide in the absence of added water is continued for a sufficient length of time to obtain a desired degree of conversion. Means assuring efficient contact between reactants and acid, such as stirring or other agitating devices are provided. The contact time preferably employed will vary in accordance with operating conditions and nature of the specific mercaptan charge to the process. A contact time in the time range of, for example, from about five minutes to three hours is generally satisfactory. Longer or shorter contact times may, however, be employed within the scope of the invention. Generally it is preferred to continue the reaction of carbon monoxide with the mercaptan charge in the absence of added water until the reaction has gone to substantial completion as evidenced by the cessation of carbon monoxide absorption. The reaction mixture is maintained at reaction temperature throughout the course of the reaction by suitable convention means. Such suitable means may comprise, for example, means for adding heat to the reaction mixture, and/or for withdrawing heat therefrom.

Solvents which are liquid under the conditions of execution of the reaction may be used within the scope of the invention. Such solvent comprises, for example, normally liquid saturated hydrocarbons, such as heptanes, octanes; aliphatic ketones, such as dimethyl ketone; etc. The solvent employed may be added to the organic charge or introduced separately into the reaction zone. It is at times advantageous to introduce the mercaptan into the reaction zone as a solution in a suitable solvent.

It is preferred to maintain the reaction conditions of temperature and pressure, in the absence of added water, for a period of time beyond that at which substantial absorption of carbon monoxide by the liquid reaction mixture has stopped. Such "digestion period" of the reaction mixture may range, for example, from about five minutes to about three hours in excess of the reaction time employed. Shorter or longer digestion periods may be used within the scope of the invention. If desired, the digestion may be executed in a zone in communication with, but separate from, the zone in which initial absorption of carbon monoxide has taken place. The presence of an atmosphere of carbon monoxide, under the reaction pressure in the absence of added water is, however, maintained throughout the reaction and "digestion" periods.

Upon completion of the reaction of the carbon monoxide with the mercaptan charge, and after the digestion period if this is employed, flow of carbon monoxide to the reaction mixture is stopped, and if the mixture is at a temperature substantially above room temperature it is cooled to a temperature not substantially in excess of about 20° C., and brought to about atmospheric pressure.

The reaction mixture obtained by interaction of the carbon monoxide with the mercaptan in the presence of concentrated sulfuric acid and in the absence of water as defined above is thereupon diluted with water. The amount of water thus added to the reaction mixture may vary considerably within the scope of the invention. Water added to the reaction mixture in an amount ranging, for example, from as little as about 2% to as much as about 2,500% by volume of the acid originally charged is found satisfactory. Greater or lesser amounts of water may, however, be employed within the scope of the invention. In a preferred method of carrying out the invention the water is added to the reaction mixture in an amount equal to from about 75% to about 500% by volume of the acid originally charged. Dilution of the reaction mixture is preferably carried out without substantial increase in temperature. It will be noted that the addition of water to the reaction mixture is effected only after completion of the reaction of carbon monoxide with the mercaptan. The water addition is effected in the absence of carbon monoxide addition and preferably in the absence of a free carbon monoxide atmosphere. The addition of the water is preferably effected at temperatures and pressures which do not substantially exceed, and which may be less than, atmospheric.

Under the above-defined conditions the reactants comprising carbon monoxide and a mercaptan are converted to reaction products comprising secondary and tertiary organic acids. When the organic charge to the process consists of a secondary or tertiary mercaptan, the organic acid product in the diluted reaction mixture will generally consist of the acid obtained by the substitution of a carboxylic acid group (—COOH) for the mercapto group of the mercaptan charge. Thus a mercaptan charge of the formula RSH will result in an organic acid of the formula RCOOH wherein R has the same meaning as in the foregoing Formula I. Under the prescribed conditions the use of tert-butyl mercaptan as the mercaptan charge to the process of the invention results in a reaction mixture containing trimethyl acetic acid (pivalic acid) as the predominant organic acid product. The use of a primary mercaptan as charge will generally result in a product comprising secondary acid corresponding to the compound obtained by replacing the —HS group of the mercaptan with hydrogen and substituting a carboxylic acid group for a hydrogen attached to the carbon adjacent to the carbon atom linked to the mercapto group of the charge. Thus, n-butyl mercaptan reacts with carbon monoxide to form 2-methylbutanoic acid, dodecyl mercaptan reacts to form 1-methyl dodecanoic acid, etc.

The reaction mechanism involved is not straight forward and does not lend itself readily to definition. Formation of intermediate compounds generally takes place. These will vary in composition with the nature of the specific organic charge used and the operating conditions maintained.

The desired organic acid product is separated from the diluted reaction mixture by conventional means comprising one or more such steps as, for example, stratification, decantation, crystallization, filtering, distillation, extractive distillation, solvent extraction, and the like. Dilution of the reaction mixture with water as defined above may result in a diluted reaction mixture separating readily into an aqueous phase and an organic phase. If organic solvent is employed in the process this will generally be found in the organic phase. Recovery of the organic acid from the separated phases may be carried out by conventional means.

The following examples are illustrative, but not limiting, of the claimed invention:

*Example 1*

500 cc. of concentrated sulfuric acid (96%) were charged to a stainless steel turbomixer. The reaction was brought to a pressure of 500 p.s.i.g. by forcing in carbon monoxide. A solution of tert-butyl mercaptan in n-heptane containing 50% by volume of tert-butyl mercaptan was fed into the reactor. The reactor was maintained at a temperature of 20° C. and a pressure of 500 p.s.i.g. The 500 p.s.i.g. pressure was maintained by forcing in carbon monoxide to replace that consumed. A total of 0.66 mole of tert-butyl mercaptan was charged in a 1.9 hour period. The reaction conditions of 20° C. and 500 p.s.i.g. were maintained for another 1.4 hours. At the end of this period the pressure was reduced to atmospheric by cutting off the source of carbon monoxide and venting. The reaction mixture was then diluted with water; care being taken to maintain the temperature below about 20° C. throughout the dilution. Dilution of the reaction mixture resulted in the formation of a supernatant organic phase and a lower aqueous phase. The organic phase was washed with water. Distillation of the two phases resulted in obtaining organic acid found to be trimethylacetic acid (pivalic acid). The trimethylacetic acid was obtained in a yield of 85% and had the following properties: boiling temperature of 89° C. at 38 mm., melting point of 33.1° C., molecular weight of 102.

Reaction of dodecyl mercaptan with carbon monoxide at 20° C. and a carbon monoxide pressure at 500 p.s.i.g., followed by the dilution of the reaction mixture with water at atmospheric pressure in the substantial absence of carbon monoxide addition results in a reaction product comprising a $C_{13}$ carboxylic acid believed to have the structure of 1-methyl-dodecanoic acid.

I claim as my invention:

1. The process for the synthesis of secondary and tertiary monocarboxylic acids having at least four carbon atoms to the molecule which comprises reacting an aliphatic mercaptan having at least three carbon atoms in the molecule, in the liquid phase, with carbon monoxide in the presence of concentrated sulfuric acid, in the absence of added water, at a temperature of from about −10° to about 100° C. at a pressure of from about atmospheric to about 1,500 p.s.i.g., said sulfuric acid being present in molar excess relative to said mercaptan, thereafter diluting the resulting reaction mixture with water in the absence of any substantial amount of free carbon monoxide addition, and separating organic acid from the resulting diluted reaction mixture.

2. The process in accordance with claim 1 wherein said concentrated sulfuric acid has a strength of at least 95%.

3. The process in accordance with claim 1 wherein said reaction is executed at a temperature of from about 20° to about 60° C.

4. The process in accordance with claim 3 wherein said reaction is executed at a pressure of from about 100 to about 650 p.s.i.g. and said dilution is effected at substantially atmospheric pressure.

5. The process for the production of secondary and tertiary monocarboxylic acids having from four to twenty-one carbon atoms to the molecule which comprises reacting an alkyl mercaptan having from three to twenty carbon atoms with carbon monoxide in the liquid phase, in the presence of concentrated sulfuric acid, in the absence of added water, at a temperature of from about −10° to about 100° C., at a pressure of from about atmospheric to about 700 p.s.i.g., said sulfuric acid being present in molar excess relative to said mercaptan, thereafter diluting the resulting reaction mixture with water in the absence of any substantial amount of free carbon monoxide addition, and separating organic acid from the resulting diluted reaction mixture.

6. The process in accordance with claim 5 wherein said reaction is executed at a temperature of from about 20° to about 60° C.

7. The process is accordance with claim 6 wherein said reaction is executed at a pressure of from about 100 to about 700 p.s.i.g., and said dilution is effected at substantially atmospheric pressure.

8. The process for the production of a tertiary monocarboxylic acid having from four to twenty-one carbon atoms to the molecule which comprises reacting a tert-alkyl mercaptan having from three to twenty carbon atoms to the molecule with carbon monoxide in the liquid phase, in the presence of concentrated sulfuric acid, in the absence of added water, at a temperature of from about −10° C. to about 100° C., at a pressure of from about atm. to about 1500 p.s.i.g., said sulfuric acid being present in molar excess relative to said mercaptan, thereafter diluting the resulting reaction mixture with water at substantially atmospheric pressure in the absence of any substantial amount of free carbon monoxide, and separating tertiary carboxylic acid from the diluted reaction mixture.

9. The process for the production of trimethylacetic acid which comprises reacting tert-butyl mercaptan with carbon monoxide in the liquid phase, in the presence of concentrated sulfuric acid, in the absence of added water, at a temperature of from about −10° to about 100° C., at a pressure of from about atm. to about 1500 p.s.i.g., said sulfuric acid being present in molar excess relative to said mercaptan, thereafter diluting the resulting reaction mixture with water at substantially atmospheric pressure in the absence of any substantial amount of free carbon monoxide, and separating trimethylacetic acid from the resulting reaction mixture.

10. The process for the production of secondary and tertiary monocarboxylic acids having at least four carbon atoms to the molecule which comprises absorbing carbon monoxide in concentrated sulfuric acid at a temperature of from about −10° to about 100° C. under an elevated carbon monoxide pressure, introducing into said carbon monoxide-containing concentrated sulfuric acid in the absence of added water while maintaining said temperature and said elevated carbon monoxide pressure an aliphatic mercaptan having at least three carbon atoms to the molecule in an amount which is less than about the molar equivalent of sulfuric acid present, thereafter reducing the pressure on the resulting reaction mixture to substantially atmospheric pressure, diluting said resulting reaction mixture with water while at substantially atmospheric pressure in the absence of any substantial amount of free carbon monoxide, and separating organic acid from the diluted reaction mixture.

11. The process in accordance with claim 10 wherein said mercaptan introduced into said carbon monoxide-containing concentrated sulfuric acid is an alkyl mercaptan having from three to twenty carbon atoms.

12. The process in accordance with claim 11 wherein said mercaptan is tert-butyl mercaptan.

References Cited in the file of this patent

UNITED STATES PATENTS

| | | |
|---|---|---|
| 2,273,785 | Larson | Feb. 17, 1942 |
| 2,572,238 | Ballard et al. | Oct. 23, 1951 |